Dec. 10, 1968 ÅKE S. GIDLUND 3,415,988
X-RAY FILM SHEET CHANGER HAVING CONVEYOR MEANS FOR SUPPLYING
AND REMOVING FILM SHEETS AT AN EXPOSURE STATION
Filed Oct. 8, 1965 2 Sheets-Sheet 1
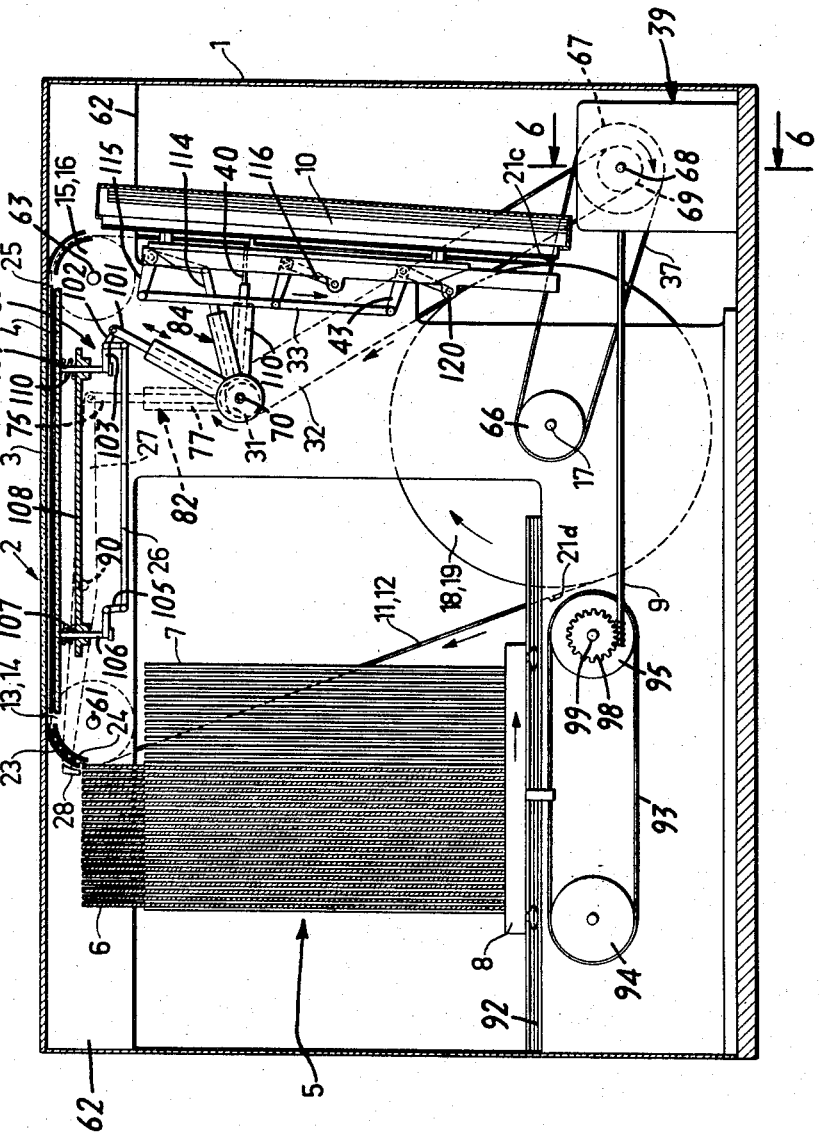
INVENTOR
ÅKE SAMUEL GIDLUND
BY Brumbaugh, Free, Graves & Donohue
his ATTORNEYS

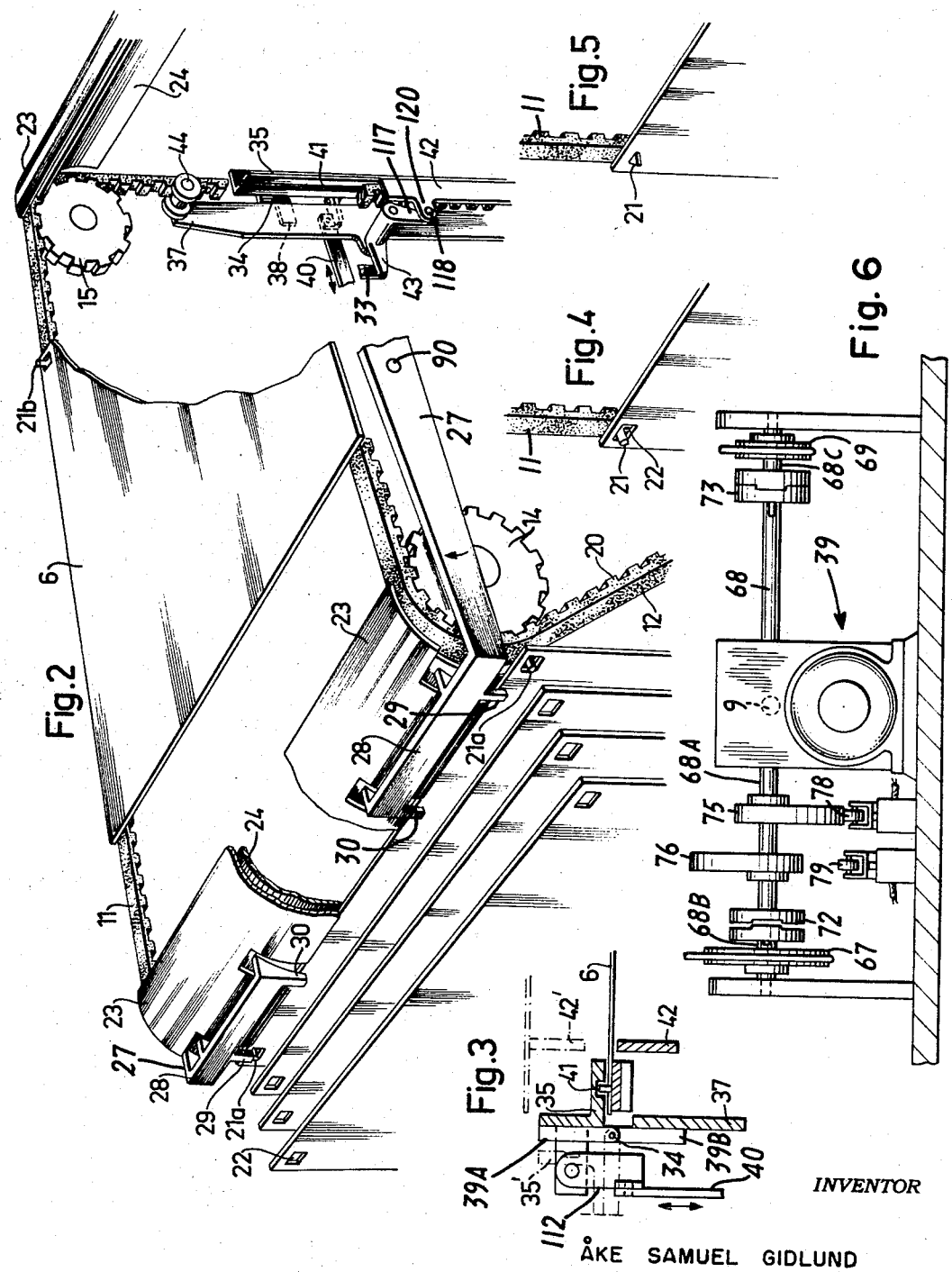

United States Patent Office 3,415,988
Patented Dec. 10, 1968

3,415,988
X-RAY FILM SHEET CHANGER HAVING CONVEYOR MEANS FOR SUPPLYING AND REMOVING FILM SHEETS AT AN EXPOSURE STATION
Åke Samuel Gidlund, Lokevagan 13B,
Djursholm, Sweden
Filed Oct. 8, 1965, Ser. No. 494,141
Claims priority, application Sweden, Oct. 9, 1964,
12,122/64
10 Claims. (Cl. 250—66)

ABSTRACT OF THE DISCLOSURE

An apparatus for X-ray photography having a storage cassette for unexposed film sheets, a storage cassette for exposed film sheets, and an exposure station between the two cassettes is provided with synchronous conveyor belts for transferring the film sheets from the unexposed film cassette to the exposure station and thence to the exposed film cassette. Intermittent drive means is provided to advance the conveyor belts. Means are also provided to mount the unexposed sheets on the conveyor belts and to remove the exposed sheets therefrom and insert them into the exposed film storage cassette. Registering projections on the conveyor belt cooperate with openings in the film sheets to hold the sheets on the belt.

---

The present invention relates to X-ray photography, and more particularly relates to an apparatus for handling film sheets used in X-ray photography.

One version of apparatus used with X-ray photography includes a first cassette for storing unexposed film sheets, a second cassette for storing exposed film sheets, an exposure station which is interposed between the first and second cassettes, and a sheet feeding mechanism for delivering an unexposed sheet from the first cassette to the exposure station and thereafter to transport the exposed sheet to a position where it is to be inserted within the second cassette.

A conventional sheet feeding mechanism in use includes a feed table, a sheet feeding mechanism, and a plurality of stop fingers positioned just forward of the exposure station and adapted to engage the forward edge of the sheet, stopping the advance of the sheet across the table. After exposure, the fingers pivot out of engagement with the forward edge of the sheet, and the sheet is transported to the storage cassette. This feeding mechanism also employs a continuously rotating feed roller and a plurality of idler rollers adapted to be moved into engagement with the constantly rotating roller to advance a sheet presented between the rollers to the stop fingers. With such a system, the feed of a sheet and the operation of the stop fingers must be synchronized.

The prior art sheet feeding mechanisms possess certain disadvantages. For example, the above-described sheet feeding mechanism in its presentation of a sheet to the stop fingers often buckles and improperly registers the sheet because of the abrupt engagement of the sheet with the fingers.

In accordance with the present invention, a sheet feeding mechanism is provided which comprises conveyor belt means having aligned registering projections, means for mounting an unexposed sheet disposed in a first cassette upon the registering projections, means for intermittently driving the conveyor belt means to present a registered sheet from the first storage cassette to the exposure station and after exposure to transport the sheet to a position before the second storage cassette, and a mechanism for removing a sheet from the conveyor belt means and inserting it into the second storage cassette.

It is a feature of this invention that the provision of registering projections on the conveyor belts eliminates the need for the stop fingers used in the prior art.

For a better understanding of the invention, reference may be made to the following description taken in conjunction with the accompanying drawings, in which:

FIGURE 1 is a schematic view of an apparatus for X-ray photography provided with a sheet feeding mechanism for controlling the feed of film sheets in accordance with the invention;

FIGURE 2 is a perspective view of the X-ray apparatus shown in FIGURE 1, partially broken away for clarity of illustration;

FIGURE 3 is a sectional view of the mechanism for removing an exposed sheet from the registering projections provided on belts and inserting it into the second storage cassette;

FIGURE 4 is a perspective view of one form of registering projection shown in engagement with a film sheet having registering openings;

FIGURE 5 is a view illustrating another version of registering projection shown in engagement with a film sheet; and FIGURE 6 is an illustration of the mechanism for driving the conveyor belts shown in FIGURES 1 and 2.

In the representative embodiment of the invention shown in FIGURES 1 and 2, an apparatus for X-ray photography includes a housing 1 providing the basic mounting for an exposure station 2, a first cassette 5 adapted to store individual sheets of film 6 each disposed in a separate slot defined between adjacent partition members 7, and a second cassette 10 which is adapted to receive and store the sheets 6 which have been exposed at the exposure station 2.

There are two spaced endless conveyor belts 11 and 12 which are arranged to be co-extensive and parallel. The distance between the outer edges of belts 11 and 12 essentially corresponds to the width of the film sheet 6. Both the belts 11 and 12 are provided with a suitable number of teeth 20 adapted to mesh with teeth formed on engaging sprockets, thereby insuring positive movement of the belts 11 and 12 without slippage. Belt 11 is trained about driven sprockets 13 and 15 and a drive sprocket 18; whereas belt 12 is trained about driven sprockets 14 and 16 and a drive sprocket 19.

As shown in FIGURES 2 and 4, there are four registering projections 21 formed on each of the belts 11 and 12. Each projection 21, in the shape of a cylindrical member, is aligned in parallel relation to its corresponding projection on the other belt so that in effect there are four pair of projections. In FIGURE 1, the first pair 21a is shown disposed at the sheet receiving position and aligned with registering openings 22 formed adjacent the top edge of each sheet 6; the second pair 21b is disposed at the exposure station 2; the third pair 21c is disposed adjacent the storage cassette 10; and the fourth pair 21d is disposed below the exposure station 2 adjacent the sprockets 18 and 19.

In FIGURE 5, another version of registering projection is a sharp projecting tooth member 21', of triangular configuration, which is adapted to engage a sheet. With the projection 21', the film sheet 6 is, of course, formed without registration openings, and the projection 21' must puncture the sheet 6.

The sprockets 13 and 14, disposed at the sheet receiving position adjacent the storage cassette, 5, are rotatably mounted on and axially spaced along a shaft 61 fixed in mounting plates 62 secured to the housing 1. The sprockets 15 and 16, rotatably mounted upon a shaft 63, secured in the plates 62, are disposed adjacent to the second cassette 10 between the exposure station 2 and the second cassette 10. Finally, the drive sprockets 18 and 19, identical in size and construction, are fixed to a rotatable shaft 17 also journalled in the plates 62. A pulley 66 keyed to the shaft 17 has an endless belt 37 trained about it and about a pulley 67 keyed to a shaft 68. The shaft is driven by a motor member 39 fixed to the bottom of the housing 1. When the belt 37 is driven by the motor 39, it rotates the shaft 17, which in turn drives the belts 11 and 12. Inasmuch as the shaft 17 controls the operation of both the sprockets 18 and 19, the belts 11 and 12 are closely synchronized in their operation.

Suitable plates 23 and 24, disposed adjacent the sprocket pairs 13 and 14 and 15 and 16, are arranged to guide and thereby insure that a sheet in its travel from the cassette 5 to the cassette 10 passes through an opening 25 defined between two screens 3 and 4 at the exposure station 2.

By means of the drive sprockets 18 and 19, arranged on the shaft 17 and driven by the motor 39, intermittent feed motion is transmitted to the endless conveyor belts 11 and 12. Preferably, the sprockets 18 and 19 periodically rotate a half revolution in a clockwise manner, inasmuch as a half revolution will advance each pair of projections 21 the distance between adjacent fixed stations or positions in the following order: the sheet receiving position, the exposure station 2, and the position adjacent the storage cassette 10, all arranged along the path of the belts 11 and 12. Three pair of projections 21 on the belts 11 and 12 will, when the belts 11 and 12 are moving, each be handling or operatively engaged with a film sheet 6. After the wheels 18 and 19 have completed their half revolution, the motor 39, for a predetermined interval, will be disengaged from the shaft 68, which action stops the belts 11 and 12. During the belt rest period, the shaft 68 will be engaged with a pulley 69 for driving the belt 32 to rotate a power control shaft 70 through one complete revolution.

Referring now to FIGURE 6, the shaft 68 actually comprises three separate shaft sections 68A, B, and C. Section 68A is continuously driven by the motor 39; whereas the sections 68B and 68C are normally stationary. However, when an electromagnetic clutch 72 is energized, it connects the section 68B to the section 68A, thereby rotating the pulley 67. When an electromagnetic clutch 73 is energized, it connects the shaft section 68C to the section 68A, driving the pulley 69. The timing of the energization of the clutches 72 and 73 is controlled by two cams 75 and 76 each keyed to the shaft section 68A. The cam 75 is adapted to close a normally open switch 78 to energize the clutch 73; whereas the cam 76 is adapted to close the normally open switch 79 to energize the clutch 72. Other mechanism for alternately driving the pulleys 67 and 69 will be obvious to those in the art and may include, for example, mechanical friction clutches and their actuation linkages, separate drive motors, and intermittent motion mechanisms such as Geneva wheel devices.

The belt 32 provides the driving means for the power control shaft 70 which drives a pulley 31, rotating the power control shaft 70 through one complete revolution. The power control shaft 70 controls three mechanisms: the first 82 is a mechanism for mounting a sheet 6 from the storage cassette 5 upon the conveyor belts 11 and 12, the second 83 is a mechanism which controls the operation of the screen plate 4 at the exposure station 2, and the third mechanism 84 controls the removal of a sheet 6 from the conveyor belts 11 and 12 and its insertion into the storage cassette 10.

The power control shaft 70 has a cam keyed thereto which is adapted to engage a cam follower provided on a shaft 75 which is urged by a spring (not shown) so that the follower engages the cam surface. The shaft 75 is mounted in a housing 77 and is adapted to reciprocate along a straight line. Further, the shaft 75 will make one complete reciprocating cycle during the interval when the belts 11 and 12 are at rest.

The mechanism 82 for moving a sheet disposed in the first cassette 5 onto the registering projection includes two crank members 27. Only the crank 27 will be described as both cranks are identical in construction and operation. The crank 27 is rotatably mounted upon a shaft 90 which in turn is secured to the plates 62. The rear end portion of the lever 27 has a projection 28 which is basically parallel with the top edge of the sheets 6 in the cassette 5 and extends inwardly so that it is positioned directly over the lead sheet 6 in the storage cassette 5. The projection 28 is formed with two sheet engaging fingers 29 and 30 which extend downwardly towards the lead sheet 6.

In operation, when the belts 11 and 12 are stationary, the reciprocating shaft 75, driven by means of the power control shaft 70, moves upwardly pivoting the crank member 27 about the shaft 90, thereby moving the projection 28 simultaneously downward and forward so that its extending fingers 29 and 30 engage the leading sheet 6 and move it to a position wherein its openings 22 receive the conveyor belt projections 21a. Thereafter, the crank 27 pivots upward and rearward removing the fingers 29 and 30 from engagement with the sheet 6, permitting the conveyor belts 11 and 12 to carry the sheet 6 upward without obstruction, between the guide plates 23 and 24 onto the exposure station 2.

The cassette 5 includes the partitions 7, arranged perpendicularly to the planes defined by the screens 3 and 4, and a bottom carriage portion 8 movably mounted upon tracks 92 and connected to an endless belt 93 trained about two pulleys 94 and 95. The means for driving the endless belt 93 is a shaft 9 having a worm gear at its free end which engages a gear 98 secured to a shaft 99 driving the pulley 95. The shaft 9 is rotated, by means of a conventional speed reducing gearing system (not shown) driven by the motor 39, so slowly that its operation is continuous. Moreover, the shaft 9 rotates at a speed such that when the belts 11 and 12 are at rest, the forward sheet 6 in the cassette 5 will be presented to the sheet mounting mechanism 82 wherein it may be moved upon the registering projection 21a.

The exposure station 2 is shown to include the fixed upper reinforcement transparent screen 3 and the lower reinforcement transparent screen or plate 4, arranged in parallel relation to the screen 3 and movable upwardly by the mechanism 83 in the conventional manner (screen approach) so that it engages a registered sheet 6 presented to the station 2 and moves it upwardly, if desired, into an engaging relation with the screen 3, which action will smooth out any ripples in the sheet 6. Although not shown, the exposure station 2 will be understood to include the necessary exposure apparatus for providing a source of X-rays to the films 6 presented to the station 2.

More particularly, the mechanism 83 includes a shaft 101, driven by a cam on the shaft 70. The shaft 101 is mounted for reciprocal motion in a linear fashion. The shaft 101 initially moves downward and by such action, rotates a bell crank 102 in a clockwise manner about its pivot shaft, which in turn rotates two lever members 26 and 103. The first lever member 26, pinned to a second crank 105, rotates the crank 105 in a clockwise manner, which action moves a shaft member 106, fixed to the screen 4, upwardly against the urging of a spring member 107 secured to the screen 4 and a fixed mounting member 108. At the same time, the lever 103 moves a shaft member 109 upwardly against the urging of a spring 110 secured to the plate 4 and the mounting member 108. Both the shafts 106 and 109 are adapted to move the plate 4 upwardly, lifting the sheet 6 off from engagement with the belts 11 and 12. During this move, the projections 21 aid in keeping the sheet 6 registered. After exposure, the shaft 101 will be moved upwardly thereby returning the screen 4 back to the retracted position disengaged from the sheet 6.

As aforementioned, when the belts 11 and 12 are at rest, the mechanism 83 is adapted to move an exposed sheet from the belts 11 and 12 and insert it into the storage cassette 10.

Turning to a detailed consideration of the mechanism 83, there are two support plates 37, one on either side of the cassette 10, each mounted adjacent to a belt and having at its extreme upward end a guide roller 44 providing a lateral guidance of the belt. It will be understood that there may be provided a suitable number of roll guiding members 44 at different positions along the path of the movement of the belts 11 and 12.

As shown in FIGURE 3, various linkages of the mechanism 84 are provided adjacent the belt 11; however, there are corresponding linkages disposed adjacent the belt 12 and so only those adjacent the belt 11 will be described. A hinge member 39 has two arms 39A and 39B connected by a hinge 34. Arm 39B is fixed to the member 37 so that the forward arm 39A is pivotally mounted about the hinge 34. Secured to the movable arm 39A is an L-shaped angle member 35 provided with a projection receiving groove 41. The projections 21 are adapted to be received by the groove 41 which provides an alignment and supporting function.

In the position shown in FIGURE 3, the angle member 35 is interposed between a sheet 6 and the storage cassette 10. Therefore, it is necessary for the member 35 to be pivoted out of the way in order for the sheet 6 to be moved forwardly, as shown in FIGURE 3 to a position in dotted lines, whereby a pusher 42 removes the sheet 6 from the projection 21 and inserts it into the cassette 10.

The means for pivoting member 35 includes a reciprocating shaft 40 mounted in a housing 110 as shown in FIGURE 1 and having a cam follower urged into engagement with a cam mounted upon the power control shaft 70. The free end of the shaft 40 has a connecting lever 112 pinned thereto (see FIGURE 3). The lever 112 is also pinned to the arm 39. After the exposed sheet 6 has been disposed of in front of the cassette 10 with the registration projections 21c located adjacent to the bottom of the cassette 10, the lever 40 is reciprocated rearwardly towards the cassette 5, thereby pivoting the arm 39 about the hinge 34 rotating the angle member 35 ninety degrees to the dotted line position 35' shown in FIGURE 3. Thereafter, the pusher member 42 is moved forwardly to the position shown as 42' and the exposed sheet 6 inserted into the cassette 10.

The mechanism for moving the pusher 42 includes a reciprocating shaft 114 mounted in a housing and driven by a cam on power control shaft 70. The shaft 114 is rotatably connected to the end of a crank 115 pinned to the fixed member 37 or some portion of the housing 1. An arm of the crank 115 has a connecting lever 33 pinned to its free end. The connecting lever 33 in turn operates two crank members 43 and 116. Inasmuch as the operation of both these members is identical, only one will be described. The crank 43 is pivotably mounted upon the plate 37 or some other fixed portion of the housing 1 and includes an arm 117 (see FIGURE 2) pinned at 118 to a projection 120 formed on the member 42.

The operation of the pusher 42 is as follows. When the shaft 114 is moved forwardly in relation to the cassette 10, the crank 115 pivots in a counter clockwise manner moving the connecting lever 33 substantially in a downward direction. The lever 33 thereby rotates the crank 43 in a counterclockwise manner and inasmuch as the crank 43 is pinned at 118 to the member 42, it drives the member 42 forwardly. Similarly, the crank 116, driven by the lever 33, drives the upper portion of the lever 42 forwardly.

Briefly reviewing the entire operation, during the time when the belts 11 and 12 are at rest, the power control shaft 70 operates the various mechanisms 82, 83 and 84 to: move a leading sheet 6 in the cassette 5 onto the registering projections 21a, provide for sheet advance at the exposure station 2, and remove an exposed sheet 6 from engagement with the belts 11 and 12 and insert it into the cassette 10. After the above operations are completed, the drive sprockets 18 and 19 will advance the three sheets 6 mounted on the projections 21 to the next fixed station along the path of travel of the belts 11 and 12.

It will be understood by those skilled in the art that the above described embodiment is meant to be merely exemplary, in that it is susceptible to modification and variation without departing from the spirit and scope of the invention. For example, in the sheet receiving position, the sheet is moved forwardly into engagement with the projections provided on the belts 11 and 12. Nevertheless, an arrangement could have been devised whereby the belts 11 and 12 would move rearwardly into engagement with the first sheet in the cassette 5. Therefore, all such variations and modifications are included within the scope of the invention as set forth in the appended claims.

I claim:

1. In an apparatus for X-ray photography having a first cassette for storing unexposed film sheets, a second cassette for storing exposed film sheets, and an exposure station including a fixed first screen and a movable second screen spaced from said first screen, said exposure station disposed between said cassettes, a sheet feeding mechanism comprising a plurality of axially aligned and rotatably mounted first members disposed adjacent said first cassette and a plurality of axially aligned and rotatably mounted second members disposed adjacent said second cassette, two spaced-apart endless conveyor belts which are coextensive and parallel, each of said belts being trained about a rotatably mounted first member and a rotatably mounted second member, said belts passing through said exposure station and having a plurality of spaced registering projection pairs, each projection aligned in parallel relation with a corresponding projection of the pair on the other said belt and means for moving said conveyor belts in synchronism in an intermittent manner a predetermined distance which present a registered sheet from said first cassette to said exposure station between said screens, power control means operable when said belts are at rest including means for mounting a sheet from said first cassette upon a pair of said registering projections, means disposed adjacent said second cassette for removing an exposed sheet from said conveyor belts and inserting it into said second cassette, and means for moving said second screen upwardly to advance said registered sheet towards said first screen.

2. A sheet feeding mechanism according to claim 1 wherein said registering projections are adapted to puncture said unexposed sheet during mounting.

3. A sheet feeding mechanism according to claim 1 wherein said unexposed sheets are each formed with openings, said sheet mounting means being adapted to move an unexposed sheet to position said registering projection into the sheet openings.

4. A sheet feeding mechanism according to claim 1 wherein said belts are both driven by a drive shaft.

5. A sheet feeding mechanism according to claim 4 including a drive motor, said intermittent means including first clutch means for connecting said shaft to said drive motor for a period to advance said belts said predetermined distance.

6. A sheet feeding mechanism according to claim 5 wherein said intermittent means includes second clutch means for interconnecting said power control means to said drive motor when said first clutch means is disengaged.

7. A sheet feeding mechanism according to claim 1 wherein said removing means includes means disposed between said second cassette and said conveyor belts for guiding said projections on said belts, means for moving said guide means to permit an exposed sheet to be advanced into said second cassette and means operable when said guide means is moved for advancing said exposed sheet into said second cassette.

8. In an apparatus for X-ray photography having a first cassette for storing unexposed film sheets, a second cassette for storing exposed film sheets, an exposure station disposed between said first and second cassettes, a sheet feeding mechanism comprising first rotatably mounted support means disposed between said first cassette and said exposure station, second rotatably mounted support means disposed between said exposure station and said second cassette, conveyor belt means carried by said first and second support means and passing through said exposure station, at least one registering projection on said conveyor belt means, sheet mounting means disposed adjacent said first cassette for mounting an unexposed sheet on a said registering projection, drive means for intermittently driving said conveyor belt means a first predetermined distance to transfer an unexposed sheet from said first cassette to said exposure station and after exposure for driving said conveyor belt means a second predetermined distance to transfer the exposed sheet to a position adjacent said second cassette, and means disposed adjacent said second cassette for removing said exposed sheet from said registering projection and inserting it into said second cassette.

9. An apparatus according to claim 8 wherein said first cassette is mounted for movement in a direction parallel to the plane of said conveyor belt means and wherein said sheet feeding mechanism further comprises means for progressively advancing said first cassette towards said sheet mounting means to present successive unexposed sheets to said sheet mounting means.

10. An apparatus in accordance with claim 8 wherein said sheet feeding mechanism further comprises means associated with said drive means operable when said conveyor belt means is at rest to actuate said sheet mounting means and said sheet removing and inserting means.

References Cited

UNITED STATES PATENTS

| | | | |
|---|---|---|---|
| 1,357,391 | 11/1920 | Freytag | 250—66 |
| 2,617,944 | 11/1952 | Sanchez-Perez | 250—66 |
| 3,075,080 | 1/1963 | Sano | 250—66 |

ARCHIE R. BORCHELT, *Primary Examiner.*

A. L. BIRCH, *Assistant Examiner.*

U.S. Cl. X.R.

250—68